J. H. DOLBY.
SHUTTER FOR CAMERAS.
APPLICATION FILED MAY 16, 1917.
1,275,230.
Patented Aug. 13, 1918.
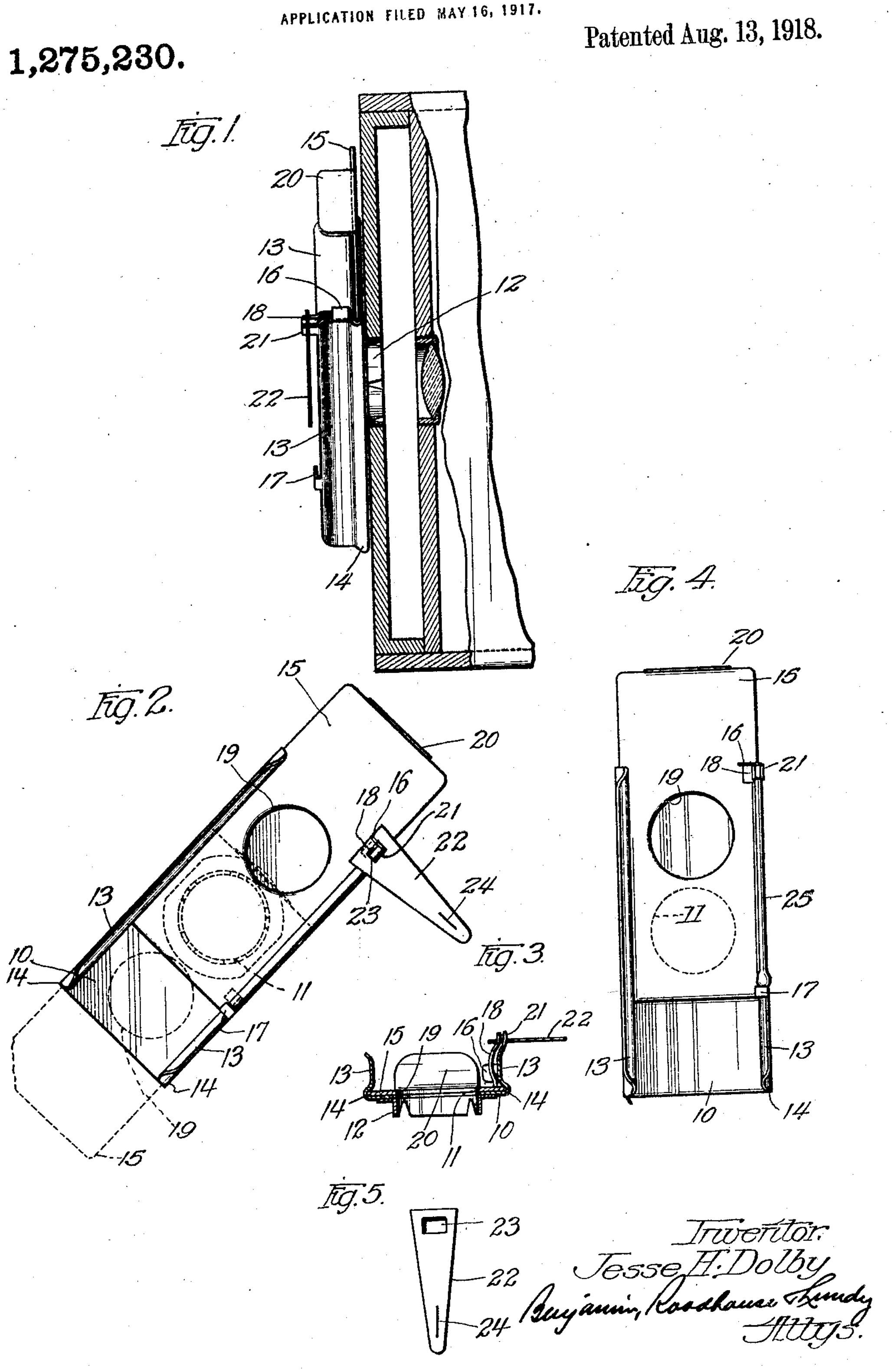
Inventor:
Jesse H. Dolby
Benjamin, Roodhouse & Lundy
Attys.
THE NORRIS PETERS CO., PHOTO-LITHO., WASHINGTON, D. C.

UNITED STATES PATENT OFFICE.

JESSE H. DOLBY, OF ELGIN, ILLINOIS.

SHUTTER FOR CAMERAS.

1,275,230. Specification of Letters Patent. Patented Aug. 13, 1918.

Application filed May 16, 1917. Serial No. 169,018.

*To all whom it may concern:*

Be it known that I, JESSE H. DOLBY, a subject of the King of Great Britain, and a resident of Elgin, county of Kane, and State of Illinois, have invented certain new and useful Improvements in Shutters for Cameras, of which the following is a specification.

My invention relates to shutters for cameras and has for its object the provision of a shutter that is adapted to be set manually and released through the medium of a destructible element. It is also an object of my invention to provide a camera shutter of this character that is capable of speedy adjustment so that relatively long or short exposures are possible without altering the construction of the shutter. A further object I have in view is the provision of a camera shutter of this type that is capable of being attached to cameras already in use, and one which may be readily and quickly installed on or removed from the camera without the use of tools for this purpose.

Other objects are the provision of a camera shutter that is dependable and efficient in its operation, and comparatively inexpensive to manufacture, so that it may be sold at a small price as an attachment or an auxiliary to a camera. Other objects and advantages of my invention will be obvious after an understanding of the preferred construction and operation of the device is had, and I prefer to accomplish the divers objects by substantially the means and in the manner hereinafter fully described and as more particularly pointed out in the claims, reference being hereby made to the accompanying drawings forming a part hereof.

In the drawings,—

Figure 1 is a fragmental longitudinal section of a camera, showing my invention in side elevation applied to the lens opening of the camera-box.

Fig. 2 is a front elevation of my camera shutter.

Fig. 3 is a transverse section thereof taken through the lens opening.

Fig. 4 is a view similar to Fig. 2 of a modified manner of setting the shutter and illustrating the device adjusted for greater speed than in Fig. 2.

Fig. 5 is a plan of a destructible element used in connection with the shutter.

Referring to the drawings, it will be seen that my invention preferably comprises a suitable channeled holder that carries a movable plate, the two elements being provided with apertures through which the exposure is made when the aperture in the movable plate passes the aperture in the holder.

The holder preferably consists of a back or base 10, having a central aperture 11 formed therein and secured upon the rear surface of the base about this aperture, is a tubular member 12, of a shape and size corresponding to the lens tube or front opening of the camera. This tubular member may be conveniently formed by stamping out and bending back the metal in forming the aperture 11, or may consist of a separate plate attached to the back and the tubular portion thereof slitted longitudinally, as shown. The device is readily attached to the camera by inserting this tubular member into the camera lens opening where it is frictionally held and can be easily removed therefrom without the use of tools. The base 10 is preferably rectangular in shape and has its longitudinal edges 13 bent sharply inwardly and then upwardly and outwardly (as illustrated in Fig. 3), whereby suitable parallel grooves 14, 14 are provided for the reception of the edges of a movable coacting diaphragm or plate 15. These edges 13 also provide suitable means whereby the device may be readily grasped between the fingers of the operator. Suitable inwardly extending stop lugs 16 and 17 are provided on one of the flanges 13, respectively at the upper end of the same and on the side thereof intermediate the ends, while an elongated finger 18 projects from the diaphragm or plate 15 above the adjacent flange 13, to coöperate with or engage said lugs at each end of its longitudinal movement.

The diaphragm or plate 15 preferably comprises an elongated strip of metal approximately the same length as said holder, that is provided intermediate its ends with an aperture 19 of substantially the same shape and dimensions as aperture 11 in the base, and one end edge, (preferably the upper edge) is bent laterally to provide a lip 20 or convenient means for the operator to grasp when setting the device.

Adjacent the upper end of the base, one of the flanges 13 is provided with a projection 21, that registers with the finger 18 when the diaphragm or plate 15 is in its "set" position, or, in other words, at the upper limit of its movement.

When the diaphragm or plate 15 has been

"set," a suitable destructible element 22 is placed over the finger 18 and projection 21 to temporarily secure these parts together and prevent the gravitation or movement of the diaphragm or plate. This element 22 may be of any convenient shape and material and is adapted to be ignited when the operator desires to make the exposure, and as soon as the same has combusted or fused, it will release its hold upon the parts 18 and 21 and permit the diaphragm or plate 15 to move downwardly or gravitate in its guides whereby the aperture 19 passes the aperture 11 and permits light to enter the lens. By inclining the device more to the horizontal, a slow movement of the diaphragm or plate 15 is obtained, or by moving it to a vertical position (Fig. 4), a rapid movement is thereby obtained. A convenient form of destructible element is illustrated in Fig. 5, which consists of an elongated strip of paper or other suitable material that has been treated with a solution of potassium nitrate ($KNO_3$) or saltpeter, to render the combustion thereof more certain. The strip is provided with an open slot 23 in one end portion, through which the finger and projection pass when the shutter is "set," and a slit 24 is cut in the opposite end portion, whereby several elements may be linked together in order to lengthen the burning of the element and increase the length of time to release the shutter. Another manner of retaining the shutter in "set" position consists in raising the diaphragm or plate 15 to its proper position and then inserting an inverted match 25 between the lug 17 and finger 18, as shown in Fig. 4 of the drawings. Upon igniting the head of the match the same will burn and as soon as a portion of the stem has become destroyed and weakened, it will give way and permit the diaphragm or plate 15 to gravitate.

What I claim is:—

1. An auxiliary shutter for cameras adapted to coact with the camera lens-opening and comprising a slidable plate having an opening therein adapted to be moved past the lens-opening, a guide therefor consisting of a movable plate of substantially U-shaped cross-section and provided with longitudinal grooves in which said slidable plate is mounted, projections on said slide plate and said guide plate adapted to be brought into register with each other, and removable means coacting with said projections adapted to retain the latter in temporary registry.

2. An auxiliary shutter for cameras adapted to coact with the camera lens-opening and comprising a slidable plate having an opening therein adapted to be moved past said lens-opening, a guide therefor in which said plate is movably mounted, projections on said plate and guide adapted to register with each other and removable means adapted to retain said projections in temporary registry.

3. An auxiliary shutter for cameras adapted to coact with a camera lens-opening and comprising a slidable plate having an opening therein adapted to be moved past said lens-opening, a guide therefor having an opening adapted to register with the camera lens-openings, a tubular embossment surrounding said opening and coacting with the camera lens-opening, projections on said plate and guide and means adapted to retain said projections in temporary registry.

4. An auxiliary shutter adapted to coact with a camera lens-opening comprising a base provided with an opening, means for securing same in front of the camera lens-opening, a slide provided with an aperture coactable with the camera lens-opening and adapted to gravitate on said base, stops for said slide, members projecting from said base and slide, and a removable element coacting with said members whereby said slide is held against movement with the aperture therein out of register with the camera lens-opening.

5. An auxiliary shutter for cameras adapted to coact with the camera lens opening and comprising a slidable plate having an opening therein adapted to be moved past the lens-opening, means for preventing the operation of said auxiliary shutter consisting of a strip of combustible material, constructed to temporarily retain relatively movable portions of said shutter in an adjusted position, said strip of material being provided with means for receiving another like strip of combustible material whereby the period of combustion before destruction is increased.

6. An auxiliary shutter for cameras consisting of a base, a slide adapted to move upon said base and provided with an aperture adapted to coact with the camera lens-opening, stops for limiting the movement of said slide, members projecting from said base and slide and a destructible element coacting with said members and adapted to hold said slide against movement with the aperture therein out of register with the camera lens-opening.

Signed at Chicago, county of Cook and State of Illinois, this 14th day of May, 1917.

JESSE H. DOLBY.

Witnesses:
E. K. Lundy, Jr.,
H. Slack.

Copies of this patent may be obtained for five cents each, by addressing the "Commissioner of Patents, Washington, D. C."